United States Patent [19]
Harrell et al.

[11] Patent Number: 5,751,460
[45] Date of Patent: May 12, 1998

[54] OPTICAL SYSTEM WITH AN ARTICULATED MIRROR UNIT

[75] Inventors: John P. Harrell, Mission Viejo; Bryce A. Wheeler, Mammoth Lakes, both of Calif.

[73] Assignee: Hughes Aircraft Company, Los Angeles, Calif.

[21] Appl. No.: 540,731

[22] Filed: Oct. 11, 1995

[51] Int. Cl.$^6$ .................... G02B 26/08; G02B 7/182
[52] U.S. Cl. ............... 359/198; 359/214; 359/225; 359/872; 359/877; 248/486
[58] Field of Search .................... 359/198, 199, 359/212, 213, 214, 225, 555, 872, 876, 877, 900; 248/486

[56] References Cited

U.S. PATENT DOCUMENTS

| | | | |
|---|---|---|---|
| 1,836,917 | 12/1931 | Hammer | 248/486 |
| 3,912,927 | 10/1975 | Hoffman, II | 359/214 |
| 4,062,126 | 12/1977 | O'Hara et al. | 359/555 |
| 4,105,301 | 8/1978 | Doeg | 359/877 |
| 4,210,385 | 7/1980 | Baudot | 359/555 |
| 4,322,128 | 3/1982 | Brake . | |
| 4,410,233 | 10/1983 | Gerhardt et al. | 248/486 |
| 4,643,539 | 2/1987 | Brignall | 359/555 |
| 4,750,486 | 6/1988 | Butler et al. | 359/876 |
| 4,854,687 | 8/1989 | Fletcher | 359/872 |
| 4,856,886 | 8/1989 | Polzer et al. | 359/876 |
| 4,887,894 | 12/1989 | Gluzerman et al. . | |
| 4,938,577 | 7/1990 | Sugita | 359/877 |

FOREIGN PATENT DOCUMENTS

| | | |
|---|---|---|
| A-0 127738 | 12/1984 | European Pat. Off. . |
| A-0-140551 | 5/1985 | European Pat. Off. . |

*Primary Examiner*—Ricky D. Shafer
*Attorney, Agent, or Firm*—Leonard A. Alkov; William C. Schubert; Glenn H. Lenzen, Jr.

[57] ABSTRACT

An articulated optical system has a pair of actuators (42, 44) each of which pivot a head mirror (34) about respective parallel axes ($E_1$, $E_2$) to direct the line-of-sight of an optical beam through a window (36) of a vehicle (30) to an optical sensor (38). Of the actuators, a coarse actuator (42) pivots the mirror (34) through substantially the entire desired field of regard of the optical system, and a fine actuator (44) pivots the mirror (34) for fine adjustment, e.g., less than five degrees. The coarse actuator (42) is positioned so that the axis thereof ($E_1$) is located as close as possible to an edge of the mirror (34), so that the radial distance therebetween is small; therefore, the size of the window (36) is minimized with respect to the diameter ($d_b$) of the optical beam. The fine actuator (44) is attached to approximately the geometric center of the mirror (34), so that the mirror (34) is statically balanced about the elevation axis ($E_2$) of the fine actuator (44); therefore, jitter and vibration are substantially eliminated.

18 Claims, 2 Drawing Sheets

OPTICAL SYSTEM WITH AN ARTICULATED MIRROR UNIT

BACKGROUND OF THE INVENTION

1. Field of the Invention

The present invention relates to optical systems used in ground-based or airborne vehicles and, more particularly, to such optical systems having an articulated head mirror for directing and stabilizing the line-of-sight of an optical beam over a field of regard.

2. Description of Related Art

Optical systems are commonly used in ground-based or airborne vehicles to provide personnel a means for viewing the outside of the vehicle. Referring to FIG. 1 of the drawings, a conventional optical system currently in use is shown. The optical system is disposed on the inside of a vehicle and generally includes a head mirror 10 obliquely situated near a window 12 and a control and stabilization unit 14 attached to the geometric center of the mirror 10. An optical sensor 16 is positioned below the mirror 10.

The mirror 10 is pivoted about a horizontal axis that is relatively near the geometric center of the mirror 10 so that static unbalance is minimized. This horizontal axis is referred to as the elevation axis, and when the mirror 10 pivots thereabout, the line-of-sight of the optical system is directed along a vertical plane, i.e., up and down on the horizon. The mirror 10 is also pivoted about a vertical axis referred to as the azimuth axis. When the mirror 10 pivots about the azimuth axis, the line-of-sight of the optical system is directed along a horizontal plane, i.e., back and forth across the horizon.

Assuming that the optical axis of the optical sensor 16 is substantially vertical, the line-of-sight of a generally circular beam reflects off the obliquely-positioned mirror 10 and is directed downwardly in a nominally vertical direction. Pivoting the mirror 10 about the elevation and azimuth axes results in the "steering" of the line-of-sight over the desired field of regard. The window 12 protects the mirror 10, the optical sensor 16, and the rest of the optical system in general from environmental hazards such as rain, dust, and so on.

It is noted that as an object such as the mirror 10 pivots about an axis, the angular distance the object travels depends upon the angle (how many degrees the object pivots) and the radial distance to the axis (i.e., arc length equals the product of the angle and the radial distance). Accordingly, as can be seen in FIG. 1, as the elevation axis is located at substantially the geometric center of the mirror 10, the upper and lower edges of the mirror 10 are located equidistantly from the elevation axis at some radial distance. Therefore, as the mirror 10 pivots, the edges thereof move a certain angular distance (having both a vertical and a horizontal component), such that the window 12 has to be located a certain distance from the mirror 10 to accommodate the horizontal displacement of the mirror 10. Similarly, the window 12 has to be large enough to accommodate the vertical displacement of the mirror 10 in order to maintain the desired field of regard.

As optical systems are typically disposed in military vehicles and aircraft, they must be designed for use in hostile environments. Therefore, the window of the optical system is a critical element in terms of vulnerability to enemy sighting and aggression, particularly as the size of the window relates to the observability by passive or active sensors the enemy may be using. Furthermore, the window is also vulnerable to natural hazards found in much of the terrain in which ground-based vehicles operate, particularly taking into consideration the fragile nature of most materials from which such windows are made.

It follows that the smaller the window, the better the system, in general. Therefore, the size of the window should be minimized while still maintaining the desired field of regard. For example, referring to the conventional system of FIG. 1, the field of regard of the line-of-sight of the optical beam from the optical sensor 16 along the elevation axis is approximately 42 degrees, as shown by angle α. As can be clearly seen, for such a field of regard the vertical dimension of the window 12 (the dimension of the window 12 in the elevation direction) is at least approximately two times as great as the diameter of the optical beam at the optical sensor 16. This is the result of the window 12 accommodating the relatively large vertical displacement of the mirror 10 as it pivots through the field of regard, i.e., angle α.

Accordingly, it would be desirable in the field of optical systems, particularly those optical systems used in military applications, for a system which would minimize the size of the window with respect to the size of the optical beam while still maintaining a stabilized line-of-sight and a desired field of regard.

SUMMARY OF THE INVENTION

A primary object of the present invention is to minimize the size of a window of an optical system used in a ground-based or an airborne vehicle without decreasing the desired field of regard or the stabilization performance of the system.

An optical system according to the invention is disposed in the interior of a vehicle and generally includes a gimballing system for stabilizing the optical system with respect to elevation and azimuth axes, an optical sensor having an optical axis, a window disposed in the vehicle, and an articulated head mirror obliquely positioned near the window for directing the line-of-sight of an optical beam between the optical sensor and the outside of the vehicle through the window. By definition, the elevation axis is substantially parallel to the horizon, and the azimuth axis is substantially perpendicular to the horizon.

More specifically, one preferred embodiment of the optical system includes an articulation system which articulates the mirror with respect to the elevation and the azimuth direction over a particular field of regard. If the mirror pivots about the elevation axis, the line-of-sight of the optical beam moves along the vertical plane, i.e., up and down on the horizon. If the mirror pivots about the azimuth axis, the line-of-sight of the optical beam moves along the horizontal plane, i.e., back and forth across the horizon.

The articulation system has a pair of actuators: a coarse actuator for driving the mirror over a large range, and a fine actuator for driving the mirror over a small range. The actuators have an arm mechanically coupled therebetween. Each actuator drives the mirror to pivot about a respective elevation axis. The coarse actuator is coupled to the gimballing assembly and positioned such that the elevation axis thereof is located as close as possible to an edge of the mirror, particularly an edge of the mirror in close proximity to the window. The fine actuator is attached to approximately the geometric center of the back side of the mirror, such that the mirror is statically balanced about the elevation axis of the fine actuator.

One advantage of the optical system according to the present invention is that the window is only slightly larger than the optical beam. As the radial distance between the edge of the mirror and the elevation axis of the coarse actuator is small, the horizontal and vertical displacement of the edge of the mirror is accordingly small with respect to the angle through which the mirror pivots, i.e., the field of regard in the elevation direction. Therefore, the vertical dimension of the window has to accommodate only a small vertical displacement of the mirror in order to maintain the desired field of regard. For example, the minimum vertical dimension of the window is slightly larger than the diameter of the optical beam for a small field of regard in elevation. More generally, the vertical dimension of the window is substantially equal to or slightly larger than the diameter of the optical beam plus the vertical displacement of the edge of the mirror.

One feature of the invention is that the line-of-sight is stabilized. Stabilization of the line-of-sight is critical to remove vibration or jitter which would cause the scene to blur to an operator. Therefore, the mirror needs to be statically balanced about an axis. If the elevation axis of the coarse actuator were the only axis of the system, then the bulk of the mass of the mirror would be located eccentric to the elevation axis, thereby resulting in substantial jitter in the mirror. Therefore, the fine actuator is positioned so that the elevation axis thereof is located at approximately the geometric center of the mirror (or near the center of gravity of the mirror), thereby statically balancing the mirror about this axis and substantially eliminating jitter which would otherwise be present.

Another feature of the invention is that the two actuators work in conjunction to drive the mirror to pivot over the desired field of regard: the coarse actuator driving the mirror quickly over a large range but with low precision, and the fine actuator driving the mirror over a small range but with high precision.

Additional objects, advantages, and features of the present invention will become apparent to one skilled in the art upon reading the following detailed description with reference to the accompanying drawings.

DESCRIPTION OF THE PREFERRED EMBODIMENTS

Figure 2:
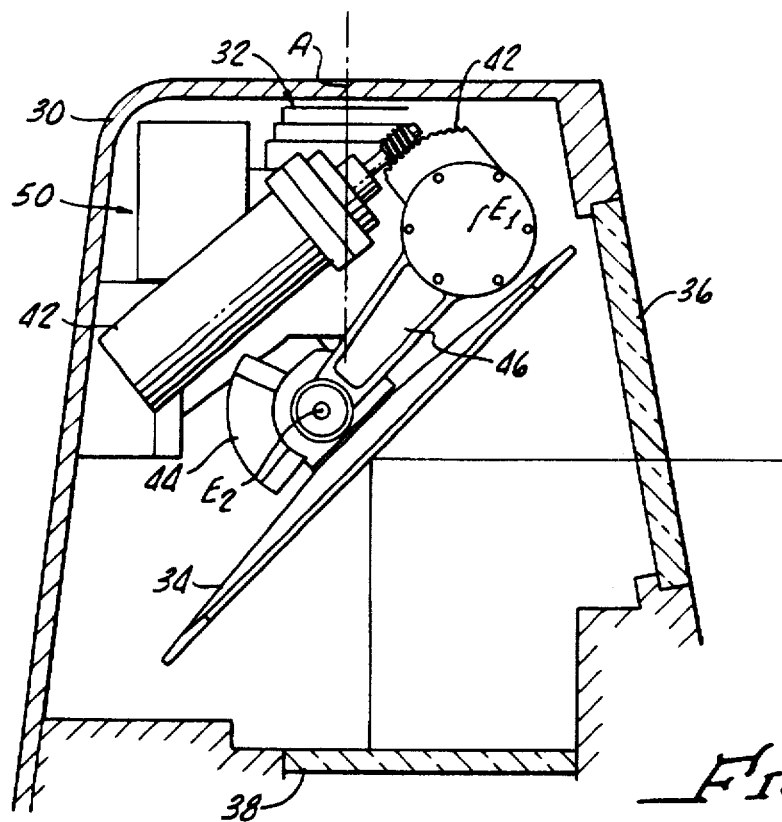
FIGS. 2 and 3 are respective side views of an articulated optical system, illustrating the principles of the present invention.
Figure 3:
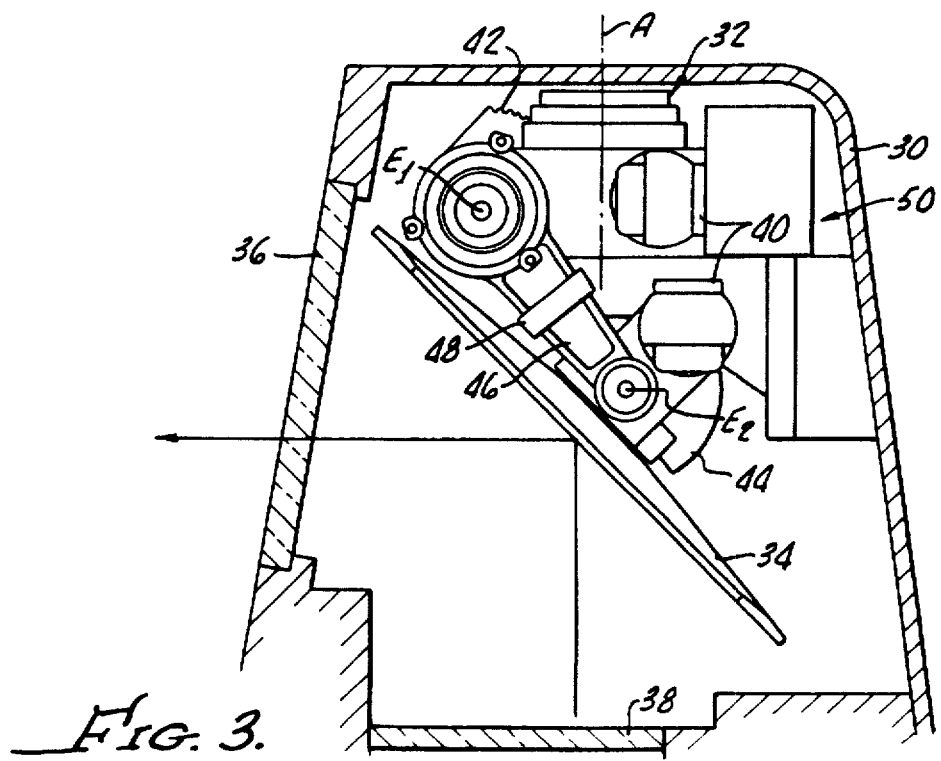

Referring to the drawings, particularly to FIGS. 2 and 3, a stabilized, articulated two-axis optical system according to a preferred embodiment of the present invention is shown from respective sides thereof. The optical system is disposed on the interior of a vehicle 30, which could be ground-based, airborne, or other, and is used to direct and stabilize the line-of-sight of an optical beam in, for example, a gunner's sight in an armored vehicle. The optical system generally includes a gimballing system 32 attached to the vehicle 30 and a head mirror 34 with the reflective surface thereof obliquely positioned near a window 36 for directing a line-of-sight of the optical beam from the exterior of the vehicle 30 to an optical sensor 38 positioned below the mirror 34. The window 36 is provided in an optical aperture through which a view outside of the vehicle is to be obtained and is substantially transparent to the optical beam. The sensor 38 provides a terminus for the light coming through the window 36 and directed onto the sensor 38 by the mirror 34.

The optical system is oriented with respect to two axes: an elevation axis defined as substantially parallel to the horizon, and an azimuth axis defined as substantially perpendicular to the horizon. The gimballing system 32 includes a pair of gyros 40 which measure inertial rates of the mirror and azimuth gimballing system, respectively.

The optical system further includes an articulation system for driving the mirror 34 to pivot about the elevation axis. The articulation system generally comprises a coarse actuator 42 and a fine actuator 44 respectively coupled to the gimballing system 32, with the fine actuator 44 further coupled to the mirror 34. A support arm 46 extends between and is mechanically coupled to the actuators 42 and 44 at respective ends thereof. The actuators 42 and 44 each pivot the mirror 34 about respective parallel elevation axes, a coarse elevation axis $E_1$ and a fine elevation axis $E_2$, respectively. The arm 46 is also pivotal about the coarse elevation axis $E_1$. A fine elevation angle sensor 48 measures the angular position of the fine elevation axis $E_1$ with respect to the support arm 46. The elevation axes $E_1$ and $E_2$ are substantially parallel to each other and substantially perpendicular to the line-of-sight of the optical beam. Pivoting the mirror 34 about the azimuth axis (shown by reference A) by the articulation system is accomplished by an azimuth actuator 50, which may be a voice-coil.

The articulation system works in cooperation with the gimballing system 32 to position the mirror 34 about the elevation axes $E_1$ and $E_2$ and the azimuth axis A to point the line-of-sight in a desired direction and to stabilize the line-of-sight along the nominal direction thereof. More specifically, the gyros 40 provide signals from which the instantaneous jitter of the line-of-sight can be determined and from which commands can be computed to drive the azimuth actuator 50 and fine actuator 44, which may be also be a voice-coil, to substantially eliminate the jitter of the line-of-sight. The coarse actuator 42, which may be an electric motor and worm gears, works in cooperation with the angle sensor 48 to rotate the mirror 34 in the elevation plane through angles larger than those intended for the fine elevation axis $E_1$ to accommodate.

This cooperation between the actuators 42, 44, and 50, the gyros 40, and the angle sensor 48 may be electrical or other means and may be controlled by a control system. The gyros 40 may be inertial-rate two-axis gyros.

As can be seen in FIG. 2, the coarse actuator 42 is positioned so that the coarse elevation axis $E_1$ is located near an edge of the mirror 34 which is in close proximity to the window 36, preferably as close as possible without hindering the movement of the mirror 34; in the exemplary embodiment shown, this edge of the mirror 34 is shown to be the top edge of the mirror 34. By positioning the coarse elevation axis $E_1$ close to the top edge of the mirror 34, the radial distance between the coarse elevation axis $E_1$ and the top edge of the mirror 34 is relatively small. Therefore, as arc length (angular displacement) is the product of radial distance and angle of rotation, the top edge of the mirror 34 is not displaced a significant distance as the mirror 34 rotates or pivots about the coarse elevation axis $E_1$.

With regard to the fine elevation axis $E_2$, the fine actuator 44 is positioned so that the fine elevation axis $E_2$ is located at approximately the geometric center of the mirror 34 (i.e., the center of gravity of the mirror 34). By positioning the fine elevation axis $E_2$ at approximately the geometric center of the mirror 34, the mirror 34 is statically balanced about the fine elevation axis $E_2$; in other words, the center of gravity of the mirror 34 is located at approximately the fine elevation axis $E_2$, so that any unbalanced moment is substantially eliminated. Therefore, vibration and jitter which would cause the scene to blur to an operator are substantially reduced or eliminated.

Figure 1:
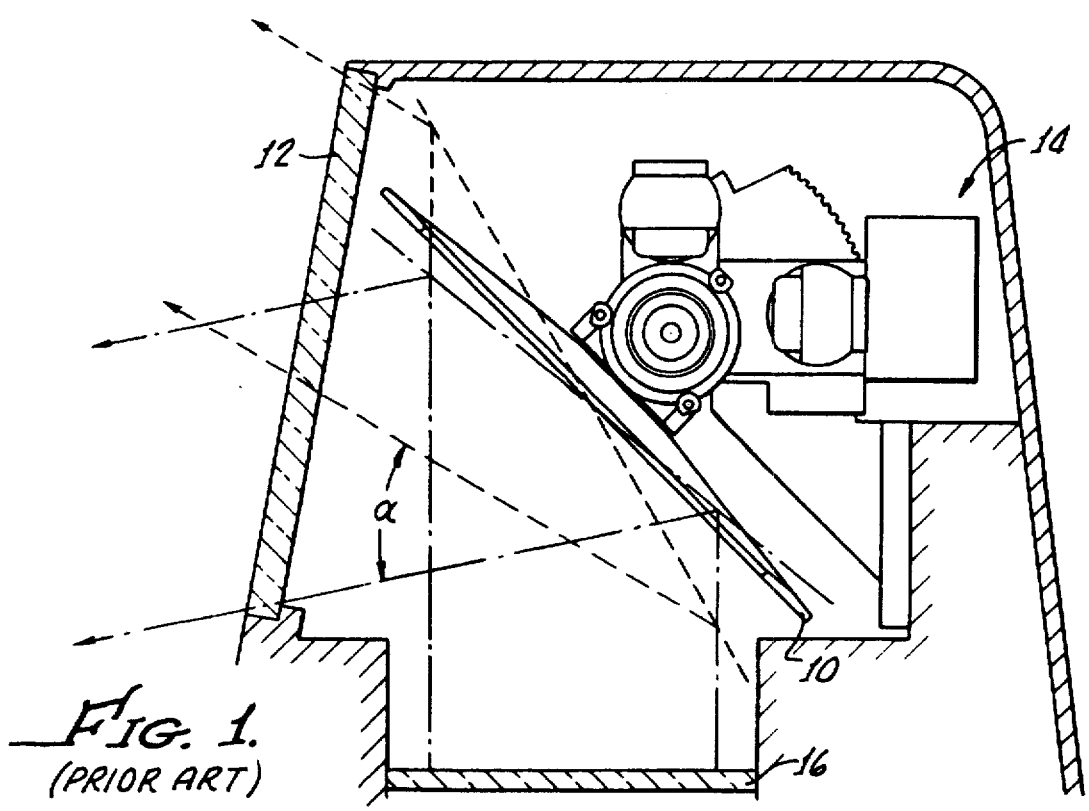
FIG. 1 is a side view of an optical system according to prior art.
Figure 4:
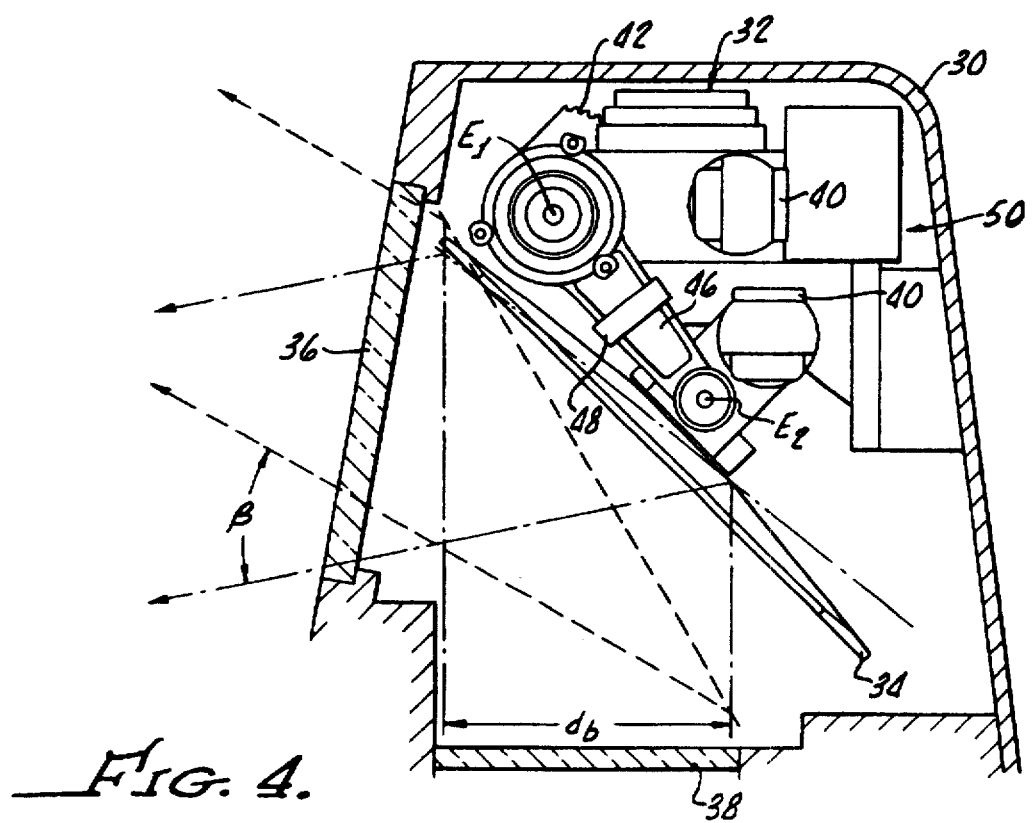
FIG. 4 is a view similar to FIG. 3, particularly showing lines-of-sight of an optical beam in a preferred embodiment of the present invention.

With reference to FIG. 4, the dotted and dashed lines represent the lines-of-sight of an optical beam which passes through the window 36 from the outside of the vehicle 30 and reflects off the mirror 34 to be received by the optical sensor 38. The optical sensor 38 may have an optical ray bundle which is generally circular, thereby having a diameter. Therefore, the optical beam is generally circular and has a diameter $d_b$. The dotted and the dashed lines respectively represent the upper and the lower limit of a desired or predetermined field of regard with respect to the elevation axis of the optical system, generally shown by angle β. The optical system may be designed for any particular field of regard, but the exemplary embodiment shown in FIG. 4 has a predetermined field of regard of approximately 42 degrees (i.e., angle β is approximately 42 degrees).

The coarse actuator 42 drives the mirror 34 (and the arm 46 and the fine actuator 44 together) to pivot about the coarse elevation axis $E_1$ through the predetermined field of regard β, and the top edge of the mirror 34 is displaced. This displacement has a horizontal component and a vertical component. Therefore, the window 36 is designed to accommodate the displacement of the mirror 36. Furthermore, as the coarse actuator 42 pivots the mirror 34 through a relatively large field of regard, the coarse actuator 42 may be designed with a relatively large tolerance in the precision of the rotation.

The fine actuator 44 drives the mirror 34 to pivot about the fine elevation axis $E_2$ through a range which is substantially less than the predetermined field of regard. In order to minimize the vertical displacement of the top edge of the mirror 34, the range of the fine actuator 44 is preferably small as the radial distance between the top edge of the mirror 34 and the fine elevation axis $E_2$ is relatively large. Preferably, the range of the fine actuator 44 is less than five degrees. Furthermore, as the range is small, the fine actuator 44 may be designed to have relatively high precision.

In order to minimize the observability of the optical system by enemy sensors, the dimension of the window 36 in the generally vertical direction may be minimized to be substantially equal to the diameter of the optical beam $d_b$ plus the vertical displacement of the top edge of the mirror 34. Depending upon the design considerations of the optical system, this dimension of the mirror 34 is preferably no more than one-and-one-half times the diameter of the optical beam $d_b$.

It should be noted that the vertical displacement of the top edge of the mirror 34 as a result of pivoting about axis $E_2$ is substantially small as the angle of rotation about the fine elevation axis $E_2$ is less than five degrees.

Accordingly, the size of the window 36 may be substantially reduced with respect to the window of previous optical systems having only one elevation axis to pivot about, thereby reducing the cost of the optical system, the vulnerability of the window 36 to natural hazards, and the observability of the window 36 in hostile environments.

In this disclosure there is shown and described only one exemplary preferred embodiment of the present invention, but it is to be understood that the invention is capable of use in various other combinations, environments, and vehicles and is capable of changes or modification within the scope of the inventive concept as expressed herein. For example, the optical system may be used to direct a beam, such as for a laser range finder, outwardly through a window toward an object of interest in the field of regard. In this case, a beam source would be located at the position of the sensor 38, possibly along with this sensor. The beam source would serve as one terminus (the origin) of the beam, while the object in the field of regard would be another terminus for the beam. With respect to laser light reflected from the object, the arrival time of which indicates distance to the object, the description set out above applies fully. Moreover, the optical system may be variably designed with respect to the size of the window 36, the predetermined field of regard (angle β), the general position of the elevation axes $E_1$ and $E_2$, the means by which the various electromechanical components are implemented, and so on.

What is claimed is:

1. An articulated optical system for directing the line-of-sight of an optical beam passing through an optical aperture, comprising:

a gimballing system for stabilizing said optical system;

optical means for serving as a terminus for an optical beam passing through an optical aperture;

a window disposed in the optical aperture and substantially transparent to said optical beam;

a head mirror having a reflective surface thereof directed obliquely toward said optical means and said window, said mirror directing the line-of-sight of said optical beam between said optical means and a field of regard; and an articulation system coupled to said gimballing system and to said mirror for pivoting said mirror about a first axis and about a second axis;

said first and second axes being substantially parallel to one another and substantially perpendicular to the line-of-sight of said optical beam, said second axis being positioned near the center of gravity of said mirror, said first axis being positioned remotely from said center of gravity;

said articulation system pivoting said mirror about said first and second axes to direct the line-of-sight of said optical beam substantially over said field of regard.

2. An optical system as claimed in claim 1, wherein said articulation system pivots said mirror through a predetermined angle about said first axis, said predetermined angle being sufficient for said mirror to direct the line-of-sight of said optical beam substantially over said field of regard.

3. An optical system as claimed in claim 2, wherein said articulation system pivots said mirror about said second axis through less than approximately five degrees.

4. An optical system as claimed in claim 1, wherein said mirror has one edge thereof positioned near said window, and said first axis is positioned near said edge of said mirror;

whereby said edge of said mirror is displaced only a small distance as said mirror pivots about said first axis, because the radial distance between said edge of said mirror and said first axis is small.

5. An optical system as claimed in claim 4, wherein said window has a dimension substantially in the direction in which said mirror directs the line-of-sight of said optical beam, and said optical beam has a diameter;

said dimension of said window being less than approximately one-and-one-half times said diameter of said optical beam.

6. An optical system as claimed in claim 4, wherein:

said window has a dimension substantially in the direction in which said mirror directs the line-of-sight of said optical beam;

said optical beam has a diameter; and said edge of said mirror is displaced as said mirror pivots through a predetermined angle about said first and second axes, said displacement being in the direction in which said mirror directs the line-of-sight of said optical beam;

said dimension of said window being substantially equal to said diameter of said optical beam plus said displacement of said edge of said mirror.

7. An optical system as claimed in claim 1, wherein said articulation assembly comprises:

a coarse actuator coupled to said gimballing system for pivoting said mirror about said first axis;

a fine actuator coupled to said gimballing system and to said mirror for pivoting said mirror about said second axis; and a support arm mechanically coupled to and extending between said actuators and pivotal about said first axis;

whereby the line-of-sight of said optical beam may be directed over said field of regard by selectively driving said mirror to pivot about said first and said second axis by means of said coarse and said fine actuators, respectively.

8. An optical system as claimed in claim 7, wherein an edge of said mirror is positioned near said window, and said first axis is positioned near said edge of said mirror.

9. An optical system as claimed in claim 8, wherein said coarse actuator pivots said mirror about said first axis through a predetermined angle, said predetermined angle being sufficient for said mirror to direct the line-of-sight of said optical beam substantially over said field of regard.

10. An optical system as claimed in claim 9, wherein said fine actuator pivots said mirror about said second axis through less than approximately five degrees.

11. An optical system as claimed in claim 7, wherein said gimballing system comprises a pair of gyros;

said gyros being in cooperation with said coarse actuator and said fine actuator to stabilize the line-of-sight of said optical means.

12. An optical system as claimed in claim 7, wherein said coarse actuator comprises an electric motor and worm gears, and said fine actuator comprises a voice-coil actuator.

13. An articulated mirror assembly for association with a window and an optical system, said articulated mirror assembly comprising:

a mirror having a reflective surface thereof directed obliquely toward a window for directing the line-of-sight of an optical beam passing through the window between a field of regard and an optical sensor, an edge of said mirror being positioned near the window; and an articulation system for pivoting said mirror about a first and a second axis, said articulation system being in cooperation with a gimballing system for stabilizing the line-of-sight of said optical beam;

said first and said second axis being spaced apart, mutually parallel, and substantially perpendicular to the line-of-sight of said optical beam, said first axis being located near said edge of said mirror, said second axis being located near the center of gravity of said mirror;

whereby said edge of said mirror is displaced only a small distance as said mirror is pivoted about said first axis because the radial distance between said edge of said mirror and said first axis is small, and said mirror is statically balanced about said second axis.

14. An assembly as claimed in claim 13, wherein said articulation system pivots said mirror about said first axis through a predetermined angle, said predetermined angle being sufficient for said mirror to direct the line-of-sight of said optical beam substantially over said field of regard.

15. An assembly as claimed in claim 13, wherein said articulation system comprises:

a coarse actuator in cooperation with the gimballing system for pivoting said mirror about said first axis;

a fine actuator coupled to said mirror near the center of gravity thereof for pivoting said mirror about said second axis; and a support arm mechanically coupled to and extending between said actuators and pivotal about said first axis;

said coarse actuator driving said arm, said fine actuator, and said mirror together to pivot about said first axis;

said fine actuator driving said mirror to pivot about said second axis.

16. An assembly as claimed in claim 15, wherein said fine actuator drives said mirror to pivot about said second axis through a range of motion of less than approximately five degrees.

17. An articulated optical system for directing a beam which passes through an optical aperture, the optical aperture being closed by a window which is substantially transparent to the beam, said optical system comprising:

optical means fixedly located on one side of the optical aperture at a terminus for the beam;

a head mirror disposed on the same side of the optical aperture as said optical means and being variably angled relatively thereto to reflect the beam passing through the optical aperture between said optical means and a field of regard on the opposite side of the optical aperture;

gimballing means pivotally supporting said head mirror, said gimballing means defining a first pivotal axis disposed generally centrally of said head mirror and substantially at a center of gravity thereof, a support arm extending from said first pivotal axis to a second pivotal axis located remote from said center of gravity of said head mirror and closer to the window, and support structure fixedly supporting said second pivot axis relative to the window, said first and said second axis being substantially mutually parallel, first means for selectively pivoting said support arm along with said first pivot axis and said head mirror relative to said second pivot axis, and second means for independently selectively pivoting said head mirror about said first pivot axis relative to said support arm;

whereby said beam may be selectively moved along a line in the field of regard by selective pivoting said head mirror, the line being perpendicular to said first and second mutually parallel axes.

18. An articulated optical system for directing a beam, said optical system comprising:

a head mirror to reflect the beam;

structure pivotally supporting said head mirror, said structure defining a first pivot axis disposed generally centrally of said head mirror and a mutually parallel second pivot axis spaced from said first pivot axis, an arm extending from said first pivot axis to said second pivot axis, first means for independently selectively pivoting said head mirror about said first pivot axis, and second means for selectively pivoting said support arm along with said first pivot axis and said head mirror relative to said second pivot axis.

* * * * *